(12) United States Patent
Saltel (10) Patent No.: US 7,584,787 B2
(45) Date of Patent: Sep. 8, 2009

(54) SEALING DEVICE FOR PLUGGING A PIPE OR A WELL

(75) Inventor: Jean-Louis Saltel, Le Rheu (FR)

(73) Assignee: Saltel Industries, Le Rheu (FR)

( * ) Notice: Subject to any disclaimer, the term of this patent is extended or adjusted under 35 U.S.C. 154(b) by 25 days.

(21) Appl. No.: 11/662,299

(22) PCT Filed: Sep. 13, 2005

(86) PCT No.: PCT/EP2005/054555

§ 371 (c)(1),
(2), (4) Date: Jul. 6, 2007

(87) PCT Pub. No.: WO2006/030012

PCT Pub. Date: Mar. 23, 2006

(65) Prior Publication Data

US 2007/0261847 A1 Nov. 15, 2007

Related U.S. Application Data

(60) Provisional application No. 60/632,707, filed on Dec. 3, 2004.

(30) Foreign Application Priority Data

Sep. 13, 2004 (FR) ................................ 04 09681

(51) Int. Cl.
*E21B 33/13* (2006.01)
(52) U.S. Cl. ...................................... 166/187; 166/179
(58) Field of Classification Search .................. 166/187, 166/387, 179; 277/322, 331
See application file for complete search history.

(56) References Cited

U.S. PATENT DOCUMENTS

| 3,604,732 | A | | 9/1971 | Malone |
| 4,815,538 | A | | 3/1989 | Burroughs |
| 5,340,626 | A | * | 8/1994 | Head ........................... 277/334 |
| 5,695,008 | A | * | 12/1997 | Bertet et al. ................ 166/187 |
| 5,778,982 | A | * | 7/1998 | Hauck et al. ................ 166/387 |
| 6,007,067 | A | * | 12/1999 | Hiorth ......................... 277/331 |
| 7,331,581 | B2 | * | 2/2008 | Xu et al. ...................... 277/334 |

FOREIGN PATENT DOCUMENTS

| DE | 1 086 500 | 8/1960 |
| FR | 2 710 155 | 3/1995 |

* cited by examiner

*Primary Examiner*—Jennifer H Gay
*Assistant Examiner*—James G Sayre
(74) *Attorney, Agent, or Firm*—Oliff & Berridge, PLC (57) ABSTRACT

The device is a sleeve that is radially expandable under the action of an inflation fluid so as to press the sleeve hermetically against a wall. The sleeve includes firstly a pair of cylindrical membranes having walls that are flexible and elastic, the membranes being engaged coaxially one inside the other, comprising an inner membrane for being subjected internally to the pressure of the inflation fluid, and an outer membrane for being pressed against the wall of the pipe or the well in order to provide sealing, and secondly, interposed between said membranes, at least one very dense annular fiber structure made up of a multitude of fine and long fibers having high mechanical strength that interconnect said end members and that are wound helically around the inner membrane, said winding being such that the density of the fibers diminishes from each end towards the central portion.

14 Claims, 8 Drawing Sheets

SEALING DEVICE FOR PLUGGING A PIPE OR A WELL

The present invention relates to a sealing device for temporarily plugging a pipe or well, in particular an oil well.

BACKGROUND OF THE INVENTION

Such a device is well known in the technical field of drilling and working oil deposits, and is commonly referred to as an "inflatable packer".

It serves to separate, temporarily, two contiguous portions of the pipe or the well from each other, e.g. in order to carry out investigations or repairs in one of the portions.

The invention relates more particularly to a sealing device of that kind in the form of an inflatable packer that is carried by a support designed to be inserted into the pipe or the well.

Such a device generally comprises:

In its deformable zone:

a tubular and inflatable "sealing membrane" of circular section, made of a material that is leakproof, flexible, and elastic, being deformable radially outwards under the action of the pressure of an internal fluid so as to press hermetically against the "mechanical structure";

a "mechanical structure" having the function of withstanding the forces exerted by the inflation pressure applied to the sealing membrane, said mechanical structure possibly being fitted with an "anti-extrusion" device serving the function of preventing the sealing membrane from being extruded through the mechanical structure; and an "outer skin" that is tubular, being made of a material that is flexible and elastic, being radially deformable by the movement of the mechanical structure.

At its ends:

a "leaktight connection" providing sealing between the sealing membrane and the end;

a "axial mechanical connection" for fastening the mechanical structure to its end and taking up all of the forces having an axial component as created by the inflation pressure; and a "radial holding ring" holding the mechanical structure radially when it is subjected to the inflation pressure.

At rest, the diameters of the device and of the packer are less than the diameter of the pipe or the well.

Once the device has been put into position in the desired zone, the packer is generally inflated by pumping in a liquid such as water, a hydrocarbon, and/or the mud present inside the pipe or the well.

The fluid is raised to a high pressure, suitable for causing the membrane to expand together with the mechanical structure, and for pressing the outer skin firmly against the wall of the zone in question in order to plug it hermetically in temporary or definitive manner.

During inflation, the packer expands radially and shortens simultaneously, depending on the shape with which the mechanical structure was made.

Once the investigation and/or repair operations are over, the packer is deflated and the device is withdrawn.

It can naturally be used again subsequently to plug a new zone of the same pipe or the same well, or to be transferred to another site, into a new pipe or a new well in order to perform the same function.

As an indication, in an application to the oil industry, the packer is generally about 1 meter (m) to 4 m long, with an initial (non-inflated) outside diameter lying in a range of 70 millimeters (mm) to 150 mm, approximately, and presenting a wall thickness (membrane, mechanical structure, and outer skin when not inflated) lying in a range 50 mm to 35 mm approximately.

The material constituting the membrane is generally natural or synthetic rubber.

Appropriate inflation of the packer requires a relatively high internal pressure to be used, presenting a value, still by way of an indication, that is usually about $3 \times 10^7$ pascals (Pa) to $4 \times 10^7$ Pa (30 megapascals (MPa) to 40 MPa).

The wall of the membrane is thus exposed during inflation to very high forces that run the risk of damaging it, or even of causing it to explode. The function of the mechanical structure is to withstand the pressure forces mechanically.

The mechanical structure is generally made up either of cables or of metal strips.

The material of the outer skin is generally natural or synthetic rubber.

In the description below, the following definitions are used:

the term "fiber": an individual cylindrical formation of very small diameter, e.g. of the order of 0.01 mm to 0.02 mm, generally made of synthetic or organic material, and usually grouped together in the form of a yarn or a roving;

the term "yarn": a long strand of small diameter, e.g. of the order of 0.1 mm to 0.5 mm, made up of fibers that are twisted and spun together;

the term "roving": a long strand of small section (less than 1 square millimeter ($mm^2$)), made up of parallel fibers taken together; and the term "cable": a bundle of steel wires or synthetic threads braided together, having a diameter of more than 0.5 mm.

At present, there exist two major categories of expandable sealing device that are known.

a) The first type referred to as a "cable" sealing device uses cables made of steel or synthetic material having a diameter lying in the range 1 mm to 4 mm that are wound helically in the wall of the sealing device and that are fastened at their ends by connection means relying on wedging, crimping, or adhesive bonding using epoxy type resins. The cables are enveloped in a flexible and deformable matrix, based on rubber or on silicone, for example.

In a known embodiment, a pair of concentric reinforcing sheets are provided, each made up of a series of parallel flexible cables wound helically at a long pitch (i.e. as a small angle of inclination relative to the longitudinal axis of the device), the cables of the two sheets sloping at angles of similar value but in opposite directions.

Initially, i.e. before the membrane is inflated, this angle is equal to about 10° to 18°, for example; during inflation of the membrane it increases to reach a final value of about 35° to 40°.

In elaborate devices, at least one similar, third sheet (auxiliary sheet) is provided that is disposed coaxially with the other two, towards the inside of the membrane but made up of cables that are finer, having a diameter lying in the range 0.5 mm to 1 mm, and that are closer to one another than are the cables of the outer (main) sheets.

The function of the auxiliary sheet is to oppose the phenomenon known as extrusion, whereby the material constituting the wall of the membrane is subjected to creep from the inside towards the outside under the action of the very high internal pressure, which runs the risk of forming a hernia passing through the interstices between some of the reinforcing yarns of the main sheets, and leading to the wall rupturing.

The cables constituting the first two sheets, referred to as main sheets, thus have the function of providing the membrane with mechanical strength, while those of the inner, auxiliary sheet constitute an anti-extrusion barrier.

In that kind of device, the density of the cables is practically identical from one end or the other, all along the axis of the packer.

b) The second type referred to as a "strip" sealing device makes use of long steel strips that are disposed parallel to the axis of the sealing device partially overlapping one another like tiles.

When the sealing device is inflated, and as the orientation of the strips varies, the strips slide relative to one another like the slats of a venetian blind.

The set of strips is in a cylindrical, annular configuration.

This set is interposed between two annular membranes, an inner membrane that provides sealing for the inflation liquid, and an outer membrane that provides sealing against the wall of the well or the casing that lines the well.

In that kind of device, e.g. as described in patent document U.S. Pat. No. 3,604,732, the metal strips perform two functions: they provide mechanical strength, and they constitute an anti-extrusion barrier.

With both types, considerable force is exerted by the pressure in the end zones (in the vicinity of each radial holding ring), in directions perpendicular to the axis of the sealing device, thus making it necessary to use metal end fittings that are thick and that consequently increase the radial size of the sealing device.

Furthermore, the density of the anti-extrusion structure, which is identical all along the device, is found to be weak in the transition zones situated between the above-mentioned end zones and the zone where the outer skin bears against the wall of the pipe or the well; unfortunately, it is in these transition zones that the anti-extrusion system is under the greatest stress, firstly because of the spacing between the cables in this location, and secondly because the mechanical structure is not supported by the wall.

All of those sealing devices need to comply with contradictory constraints imposed by the conditions encountered in wells.

In particular, they must:
a) withstand a plurality of inflation-deflation cycles while maintaining a size that is close to their initial size;
b) be capable of accepting large deformation ratios, possibly as great as 3:1;
c) present small radial size so as to be capable of being laid through constrictions of limited diameter;
d) withstand high differential inflation pressures, of values that reach 30 MPa to 40 MPa; and
e) be capable of being placed in environments that are aggressive, both in terms of temperatures which may exceed 180° C., and in terms of corrosion, since they can be exposed to a variety of fluids (water, oil, and gas in particular).

Although in widespread use, both of the above-mentioned types of sealing device present their respective drawbacks, which the present invention seeks to resolve.

The first type of device has good memory qualities and can withstand a plurality of inflation and deflation cycles while conserving a size that is close to its initial size. Nevertheless, its performance is limited in terms of withstanding temperature and inflation pressure, firstly because of the limited density of cables used to provide the mechanical function, and secondly because of the presence of gaps between the cables which are supposed to be providing the anti-extrusion function in the zone situated between the metal ends and the wall.

In addition, the dual arrangement of cables enveloped in the flexible matrix presents a size that is relatively large, increasing the radial size of the sealing device before inflation.

The device described in patent document U.S. Pat. No. 5,340,626 proposes a particular arrangement of cables seeking to attenuate those drawbacks.

The cables present winding angles that are different at the ends and in the central portion in order to limit the force exerted on the end members and thus reduce the size of those members. That device solves the problem associated with extrusion by using a special set of short fibers having the purpose of limiting the extrusion of the elastic matrix through the cables that provide the mechanical strength. The device described solves the problem of the leakproof membrane being extruded between the mechanical structure, but only by adding a structure that is made up of short fibers and that is not sufficient in the zone immediately adjacent to the zone bearing against the wall, whenever the expansion, pressure, and temperature stresses become large.

The second type of device, having strips, is better at withstanding pressure and temperature than the first, and its radial size is relatively small.

However, it has very poor ability at returning to its initial size after an inflation-deflation cycle.

Although of interest, neither of those two known types of device can give complete satisfaction in fulfilling the needs of sealing devices that are used in difficult conditions, by satisfying the various constraints mentioned above.

OBJECTS AND SUMMARY OF THE INVENTION

An object of the present invention is to mitigate that shortcoming, by proposing a third type of sealing device using a fiber structure.

The sealing packer of the invention, having the function of plugging pipe or a well, comprises in conventional manner a sleeve fastened to end members and radially expandable under the action of an inflation fluid in order to be pressed hermetically against the wall of the pipe or the well, the sleeve itself being made up of a sealing membrane, a mechanical structure, and an outer skin.

This device is remarkable by the facts that said packer in form of a sleeve comprises firstly a pair of cylindrical membranes having walls that are flexible and elastic, the membranes being engaged coaxially one in the other and comprising an inner membrane for being subjected internally to the pressure of the inflation fluid and an outer membrane for being pressed against the wall of the pipe or the well in order to seal it off, and secondly at least one very dense annular fiber structure formed of a multitude of fine and long fibers having high mechanical strength interconnecting said end members and wound helically about the inner membrane along an axis that coincides with the longitudinal axis of symmetry of the sleeve, and that said fiber structure firstly presents a certain thickness and secondly is interposed between said membranes, and that, in addition, the winding angle of the fibers relative to the direction of said longitudinal axis of symmetry has a value that is considerably greater in the end portions of the sleeve than in the central portion thereof, the transition between the two portions taking place progressively, with the angles taking on an intermediate value, the winding being such that the density of the fibers diminishes from each end going towards the central portion, the angle of inclination of the fibers before expansion being calculated slice by slice in such a manner that in each of the annular slices of the fiber structure the shortening ratio after radial expansion of the sleeve is substantially constant over the entire thickness of said slice.

Thus, the fibers, rovings, yarns, or cables of the structure are at a density at the ends of the sleeve that is greater than their density in its central portion, and their laying angle is calculated in such a manner that practically all of them behave in the same manner when a pressure is applied inside the packer and they are subjected to mechanical stress all together, in a manner that is identical or quasi-identical.

According to an advantageous characteristic of the invention, the density of the annular fiber structure is such that after the sleeve has expanded radially, said fibers are touching or practically touching, such that the structure serves simultaneously both to provide mechanical reinforcement for withstanding high pressure forces and as an anti-extrusion filter to prevent any extrusion of the inner membrane between the fibers under the effect of the pressure.

It thus performs simultaneously the role of a mechanical structure and the role of an anti-extrusion structure.

The density of the fibers is thus varied relative to the axis of the sleeve by acting on the fiber winding angle.

Before inflation, the fibers are advantageously laid at an angle of about 45° to 60° in the end portions of the sealing device, and at an angle of 15° to 30° in the central portion thereof, with the transition between two portions taking place progressively, with angles of intermediate value.

The angles are considered relative to the longitudinal axis of the device.

Another characteristic of the invention is that the angle at which the fibers are placed is calculated in such a manner that each fiber is stressed mechanically so as to be under tension when pressure is applied inside the packer, regardless of the position of the fiber relative to the axis of the packer or relative to its position in the thickness of the fiber structure.

The large quantity of fibers, in particular in the end zones, associated with the tension in each fiber makes it possible to limit most severely the size of gaps between fibers and thus avoid any extrusion of the sealing roving.

One of the advantages of the invention is thus to avoid having recourse to an anti-extrusion system other than the fiber structure that is used as a mechanical structure, thus making it possible to limit the thickness of the packer. In addition, the laying angle of the fibers, greater at the ends than in the central portion, makes it possible to decrease or even eliminate the radial holding ring.

The smaller fiber density in the central portion makes it possible to obtain better deformation of this zone where that is necessary (zone in contact with the wall), without any risk of rupture, since that is the zone where the packer is subjected to least stress.

Before inflation, since the laying angle of the fibers varies from one end to the other, it is necessary to subdivide the packer (virtually) into thin slices, e.g. each having a width of 10 mm, in order to perform calculations on the assumption that the angle of each fiber does not vary over the width of a slice.

This feature makes it possible to ensure that each fiber is stressed and tensioned in a manner that is identical or quasi-identical when pressure is applied.

In terms of geometrical shape, this means that in a slice under consideration, each fiber presents an identical radial shortening movement on going from the deflated state to the inflated state.

Calculations are performed on slices that are cut (virtually) perpendicularly to the axis and that are of a thickness that is sufficiently small (e.g. less than 1 centimeter (cm)) to enable the calculation to provide good accuracy relative to the way in which the angle of the fibers varies along the axis of the packer.

Furthermore, according to certain characteristics of the invention that are advantageous but not limiting:

the density of fibers within said fiber structure, in a section plane extending transversely to the sleeve, lies in the range 100 fibers per square millimeter (fibers/mm$^2$) to 45,000 fibers/mm$^2$, and is preferably about 10,000 fibers/mm$^2$;

the fiber structure is made up of a plurality of rovings or yarns that are independent from one another and that are laid together, against one another, so as to constitute a structure that is dense and uniform;

said fiber structure is made up of a plurality of contiguous concentric sheets, and the angular orientations of the fibers making up two contiguous sheets are opposite;

at least some of said rovings or yarns are common to a plurality of sheets;

held captive between said inner and outer membranes, the device includes an agent that can be compressed very little, that is liquid or pasty, and relatively fluid, with the fibers constituting the fiber structure being immersed therein;

said agent is an oil, a grease, or silicone resin; and the fibers constituting said fiber structure are coated in a material that is solid but that presents characteristics of high flexibility and elasticity, and that does not interfere with the ability of said structure to deform freely relative to the membranes enclosing it.

BRIEF DESCRIPTION OF THE DRAWINGS

Other characteristics and advantages of the invention appear on reading the following description of a preferred embodiment of the invention.

The description is made with reference to the accompanying drawings, in which.

MORE DETAILED DESCRIPTION

Figure 1:
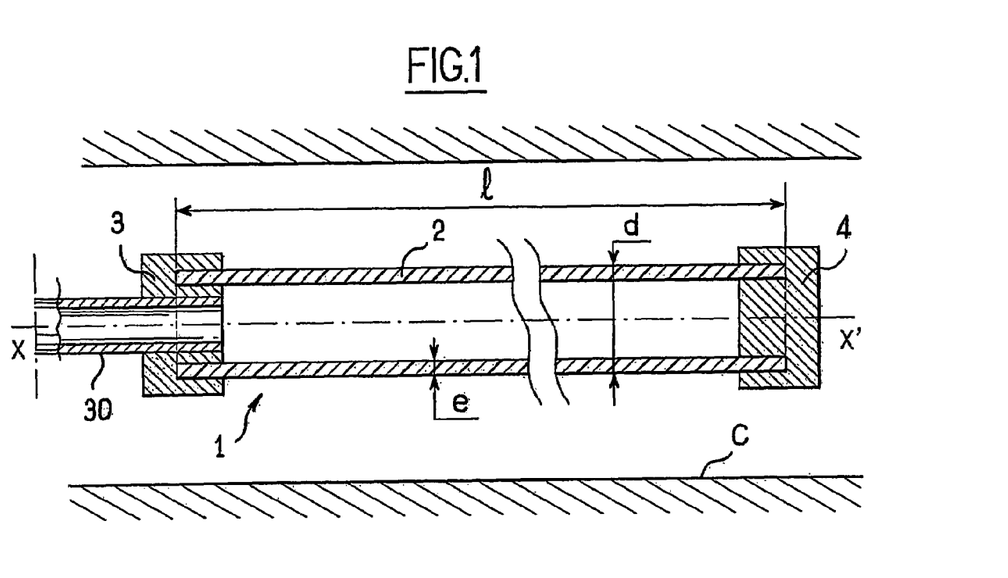
FIGS. 1 and 2 are diagrammatic axial section views of a conventional sealing device placed inside a well or a pipe that is to be plugged, shown respectively before and after being inflated.

In FIG. 1, reference C designates the wall of a pipe, or of a well, e.g. for extracting oil.

This wall is cylindrical about an axis X-X', and in a well it may be constituted by the raw wall of the drilled well, or by a lining of steel or of synthetic material if the well is cased.

Its axis X-X' is shown horizontally in the figure merely for convenience in drawing.

It could naturally be oriented in some other way, and in particular it could be oblique or vertical.

The sealing device 1 essentially comprises a cylindrical sleeve 2 centered on the axis X-X' and carried by a pair of retaining members 3, 4.

These members are rigid end washers, e.g. made of steel, and connected to each other by the sleeve 2.

The sleeve possesses a wall that is flexible and elastically deformable.

Its ends are closed by the washers 3 and 4 which are secured thereto in leaktight manner, e.g. by adhesive.

The dimensions of such a device may vary very widely depending on the application.

Purely by way of indication, the (non-inflated) sleeve may have a length l equal to 2.5 m, a diameter $\underline{d}$ equal to 120 mm, and a wall thickness $\underline{e}$ equal to 20 mm.

Equipment of known type (not shown) serves to move the device inside the well in order to position it in register with the zone to be plugged, and to introduce an inflation liquid under high pressure into inside of the sleeve 2.

For this purpose, the washer 3 is provided with a liquid feed duct 30.

Figure 2:
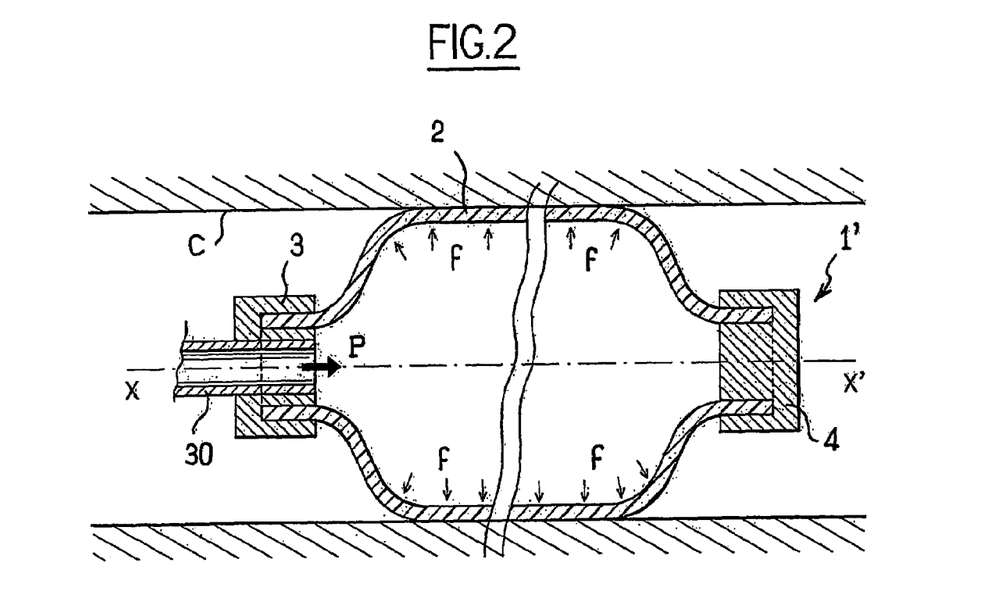

In FIG. 2, this introduction of liquid under pressure is represented by arrow P, and the effect of the internal pressure is to deform the wall of the sleeve radially outwards, such that its central portion becomes firmly pressed in leaktight manner against the wall C, as represented by the arrow $\underline{f}$ in FIG. 2.

As an indication, the inflation pressure may reach a value of about $3 \times 10^7$ Pa to $4 \times 10^7$ Pa, approximately.

The radial expansion of the sleeve leads to a reduction in its length, thereby moving the washers 2 and 3 towards each other.

It is desirable for the diametral deformation ratio of the sleeve to be at least 3:1 (tripling in diameter).

The device is thus subjected to high levels of mechanical stress, with this happening in a medium that is often aggressive and at temperatures that are high.

Furthermore, a single device must be capable of being used several times within a given well or a given pipe, for example about 20 times, so as to make it possible to proceed with given investigations, for example in order to measure the porosity of the wall at different zones that are axially spaced apart.

After each inflation-deflation cycle, the sleeve must return to a diameter close to its initial diameter, which assumes that it possesses good elastic qualities.

Figure 7:
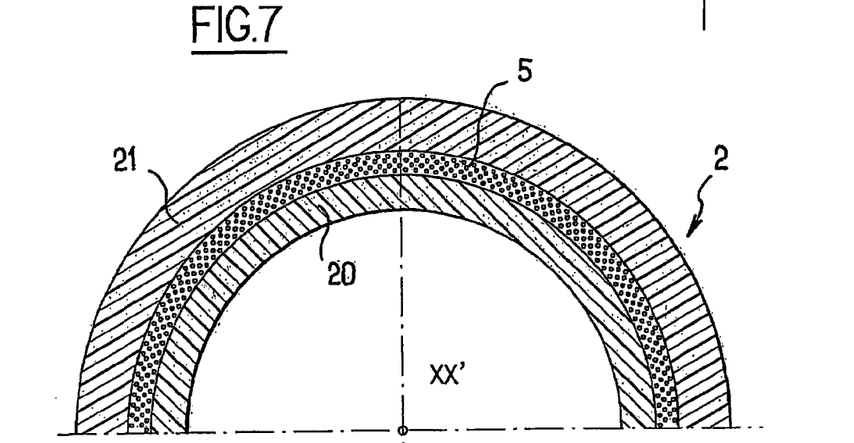
FIG. 7 shows the same device in half cross-section.

In accordance with the invention, as can be seen in particular in FIG. 7, the sleeve 2 comprises a pair of cylindrical membranes that are engaged coaxially one in the other, comprising an inner membrane 20 for being subjected internally to the pressure of the inflation fluid, and an outer membrane 21 for pressing against the wall C of the pipe or well in order to provide sealing.

These membranes 20 and 21 with a wall that is flexible and elastic are advantageously both made of elastomer material; nevertheless, they do not necessarily have the same composition, since the two membranes are not exposed to the same fluids, nor are they subjected to the same stresses.

The varieties of elastomer that are most suitable can thus be selected as a function of different applications.

Between these two membranes there is interposed a very dense annular fiber structure 5 made up of a multitude of long fibers that are of very small section and that present high strength.

Each of these fibers interconnects the two end members 3 and 4, being secured thereto via end portions, and each is wound helically around the inner membrane 20, with the axis of the resulting helix coinciding with the longitudinal axis of symmetry X-X' of the sleeve.

The inner membrane 20 provides sealing.

The membrane 21 is the outer skin that is to be pressed against the wall of the pipe or the well in order to plug it when the device is inflated.

The outer skin 21 may be shorter than the inner membrane 20 and than the intermediate structure 5, since it is only the inner membrane 20 and the intermediate structure 5 that are then held captive and retained in conventional manner by respective radial holding rings to the end members 3 and 4.

As can be seen in FIGS. 9, 10, 9A, and 9B, the set of fibers can be subdivided into a large number of yarns or roving comprising pluralities of fibers side by side, each roving constituting an independent subassembly, presenting a section that is not negligible, e.g. of several square millimeters, so as to make the rovings easier to handle, and in particular to wind, than individual fibers.

Figure 9:
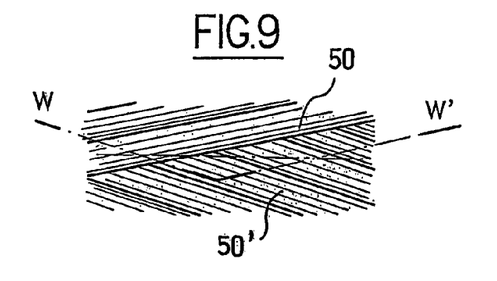
FIGS. 9 and 10 are detail views showing two different possible configurations of the rovings or yarns in two contiguous sheets.
Figure 9A:
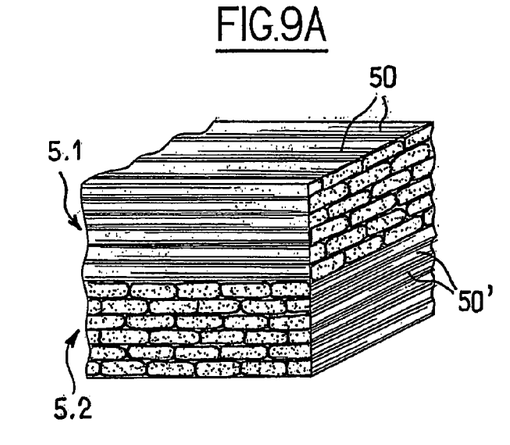
FIGS. 9A and 9B are detail views in perspective and on a large scale of two contiguous sheets constituted by superposed rovings or yarns respectively, the section plane being in the form of two planes forming a dihedral given reference W-W' in FIG. 9.

In FIG. 9A, within a roving, the fibers may be merely juxtaposed, without being bonded to one another, thus forming a bundle of fibers similar to a tow.

Figure 9B:
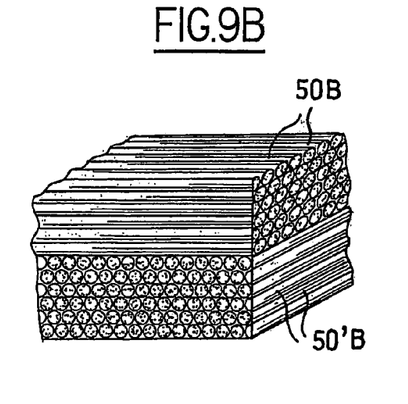
Figure 9C:
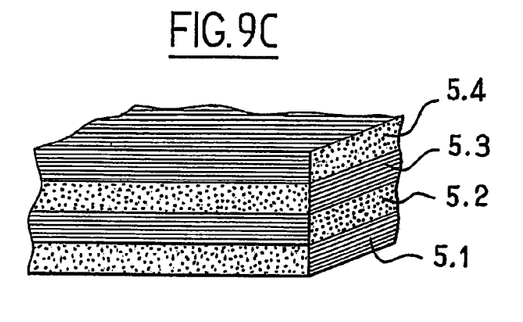
FIGS. 9C and 10A are detail views similar to the above views, showing superposed fiber sheets in two different configurations.

In FIG. 9B, on the contrary, the fibers are bonded to another by twisting or interlacing thus forming a bundle of fibers similar to a yarn.

For reasons of simplicity, these rovings or yarns are referred to generically by the word "roving" below in the present description and in the claims, regardless of whether the fibers constituting the bundle in question are free, twisted, interlaced, or otherwise.

In the example shown in FIGS. 6 to 8, 9C, and 10A, the fiber structure 5 is made up of four annular concentric sheets referenced, from the inside towards the outside: 5.1, 5.2, 5.3, and 5.4.

Each of these sheets is made up of a plurality of juxtaposed rovings 50, 50', i.e. rovings that are placed against one another and superposed.

Figure 6:
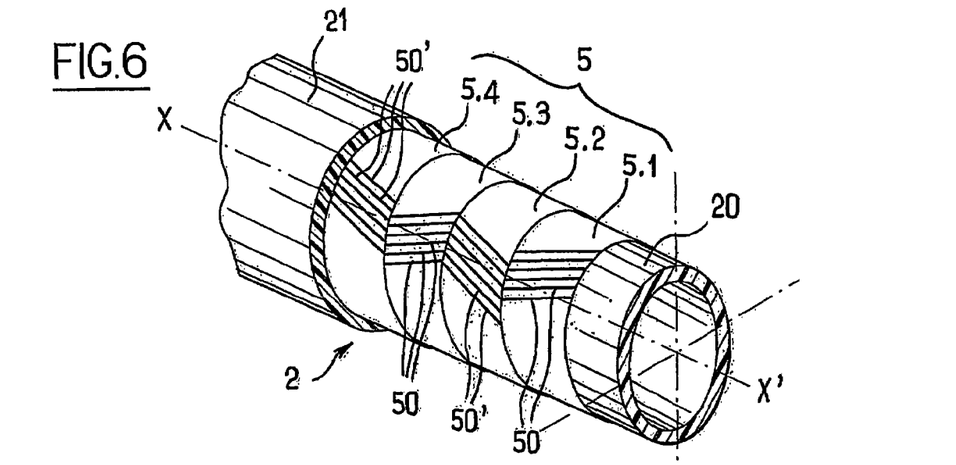
FIG. 6 is a fragmentary view in perspective and in section showing the same device, showing four sheets of rovings interposed between the inner and outer membranes.

The value of the winding angle of the rovings 50' constituting a sheet (5.2 or 5.4) is advantageously very close to the value of the angle of the rovings 50 constituting the sheet (5.1 or respectively 5.3) that is contiguous therewith, but in the opposite direction, as shown in FIG. 6.

In practice, the angles are of a value that increases very slightly on going further away from the axis X-X'.

In the central region of the sleeve, over a greater or lesser length, corresponding to the zone that is to press against the wall C, this angle (defined relative to the longitudinal direction X-X') has a value that is constant and relatively small, less than 30°.

In contrast, it is considerably greater in the end portions, advantageously lying in the range 45° to 60°, and for example close to 50°.

Between the central region and the end portions, the angle has a value that increases progressively.

The way this variation in angle is determined is explained in greater detail below with reference to FIGS. 15 to 18.

Figure 3A:
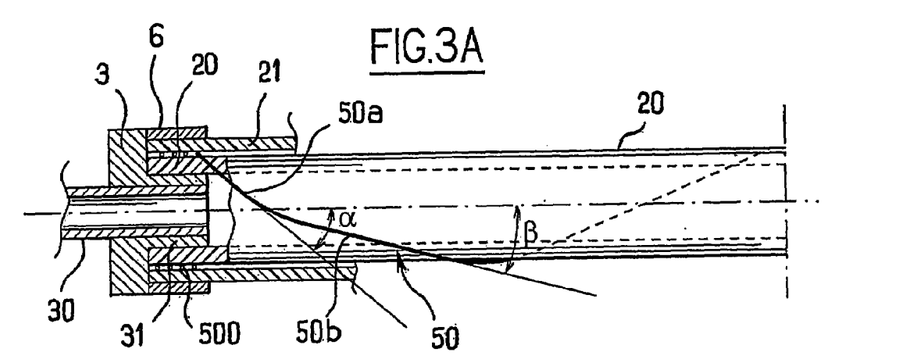
FIGS. 3A and 3B are diagrammatic side views that are partially in section, and that have certain elements cut away, each showing an end portion of a device in accordance with the invention, these views serving essentially to show the winding of a roving or a yarn of fibers on the inner membrane.
Figure 3B:
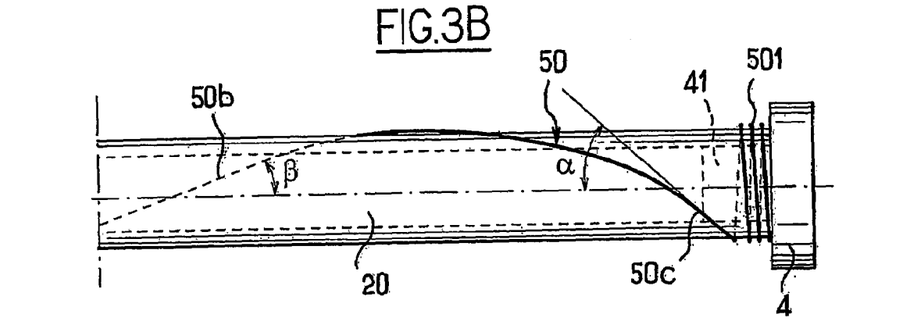

FIGS. 3A and 3B show how a roving 50 is wound around the inner membrane 20.

Each of the washers 3 and 4 possesses a cylindrical central portion or core 31 or 41 respectively, on which the inside wall of the cylindrical membrane 20 is engaged without clearance and is bonded by adhesive.

On these cores 31, 41, the roving 50 is wound annularly through a few turns. The roving is also fastened at this point to the membrane 20 by adhesive; in addition, a collar 6 serves to clamp the end portion of the membrane 21 against the winding, and against the end portion of the inner membrane 20, thereby bonding the assembly against the core. Advantageously, the cylindrical outer membrane 21 is also bonded around the end portion of the inner membrane 20 by adhesive.

Figure 4:
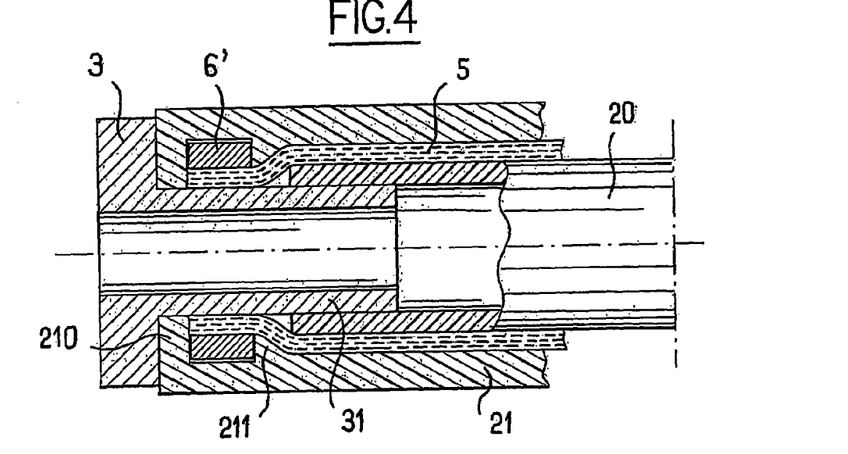
FIG. 4 is an axial section view showing a preferred way of fastening the sleeve on an end member.
Figure 5:
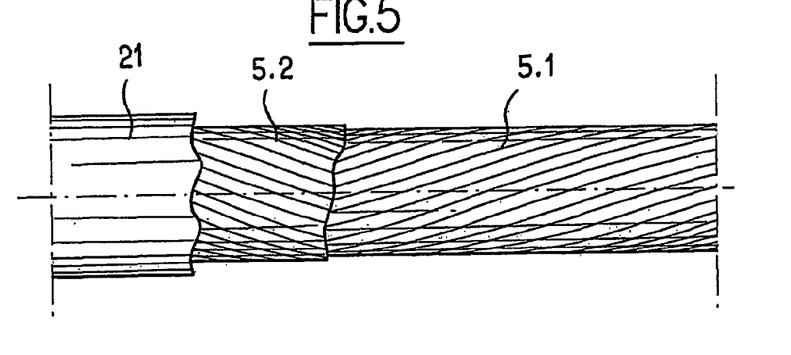
FIG. 5 is a diagrammatic side view, with certain elements cut away, showing the central zone of the device, with two contiguous sheets of rovings.

Advantageously, as shown in FIG. 4, the fiber structure 5 is fastened directly on the core 31 by means of the clamping collar 6', while the end of the inner membrane 20 is bonded to the same core by adhesive.

The end portion of the outer membrane 21 is thus shaped so as to present an inner groove that receives the ring 6' and that is beside an annular end stub 210 bonded to the core 31 by adhesive and a sloping annular projection 211 that presses against the fiber structure 5 so as to provide it with a shoulder when it deforms as a result of the sleeve being inflated.

A similar mounting system is naturally provided at the opposite end, on the retaining member 4.

From one end of the sleeve to the other, the roving 50 is wound helically on the membrane 20.

The pitch of the helix varies.

At each end of the roving 50, in the zones where it is connected with the washers 3 and 4, its respective segments 50a and 50c, and thus the fibers making it up, form an angle α relative to the direction X-X', the angle α having a value close to 54°.

Between these two end segments, the main (central) portion 50b of the roving 50 (and thus of the fibers making it up) form an angle β relative to the direction X-X', the angle β having a value lying in the range 10° to 18°. For example it is equal to 12°.

The transition between the slightly inclined central portion 50b and the ends 50a and 50c takes place with the angle varying progressively.

As shown in FIGS. 9A and 9B, each sheet is made up of a plurality of adjacent and superposed fiber rovings that are oriented in this way.

The fibers are flexible and are circular in section.

The diameter of the fibers is advantageously about 10 micrometers (μm) to 20 μm.

Under such circumstances, fiber density within the fiber structure, taken in cross-section, lies in the range 3000 fibers/$mm^2$ to 12,000 fibers/$mm^2$.

The fibers may be carbon fibers, for example.

The fiber structure 5 has a wall that serves both as a mechanical structure for withstanding pressure forces, because of the very high density of the fibers, and as a filter for preventing the inner sealing membrane 20 being extruded in any way, given the small diameter of said fibers.

Advantageously, the fiber structure 5 is not embedded within the material constituting the wall of the sleeve 2. It is independent therefrom and free to expand or contract appropriately as a function of the stresses which are applied thereto without being subjected to the deformation of the surrounding elastic material.

Since the two membranes 20 and 21 are also independent of each other, they can move while expanding and shrinking, equally well relative to each other, and relative to the fiber structure they surround, thus also encouraging them to retain their elastic properties.

In order to avoid a phenomenon of the membranes 20 and 21 sliding axially relative to the fiber structure 5, and when the fiber structure has multiple sheets, it is nevertheless possible to envisage bonds, e.g. by adhesive, between the outer fiber sheet and the inside face of the outer membrane 21, and between the inner fiber sheet and the outer face of the inner membrane 20, with the intermediate sheets remaining free.

The orientation of the fibers as mentioned above makes it possible to limit or even eliminate any radial force applied to the ends when the sealing device is inflated.

The characteristics of the invention make it possible to solve most of the problems explained in the introduction of the present description and associated with using so-called "cable" or "strip" sealing devices.

The device is capable of withstanding a plurality of inflation-deflation cycles, while conserving a size close to its initial size, because of the ability of the fiber structure to deform radially when the fiber is inflated and returned to its initial position on being deflated.

The fiber structure can be subjected to a high deformation ratio, enabling the sealing device to go beyond a deformation ratio of 3:1.

The radial size of the device is small because of the high density of fibers and because no additional anti-extrusion device is used.

By using fibers with high tensile strength, it is possible for the inflation pressures to be extremely high.

Figure 8:
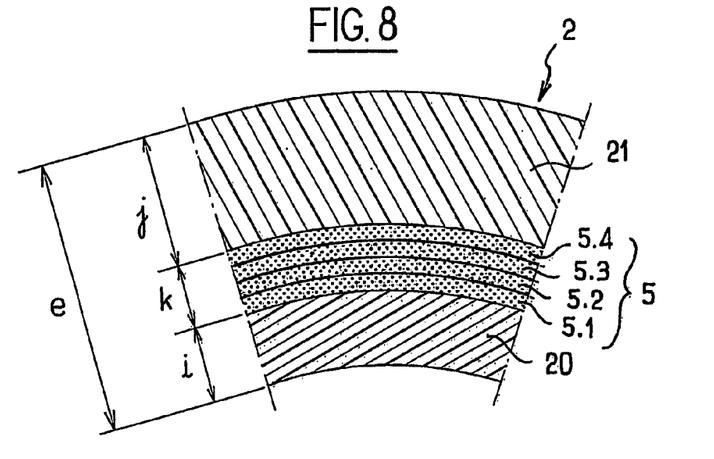
FIG. 8 shows a detail of FIG. 7 on a larger scale.

With reference to FIG. 8, and merely by way of one possible example of dimensions, for the wall of the sleeve 2 having thickness e equal to 20 mm, the inner membrane 20 has thickness i of about 5 mm, the annular fiber structure 5 has thickness k likewise of about 5 mm, while the outer membrane 21 has thickness j of about 10 mm.

The crossed rovings 50, 50' of two adjacent sheets may be merely superposed, as shown in FIGS. 9, 9A, 9B, and 9C.

Figure 10:
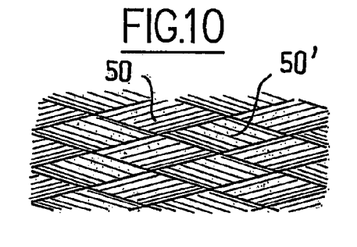
Figure 10A:
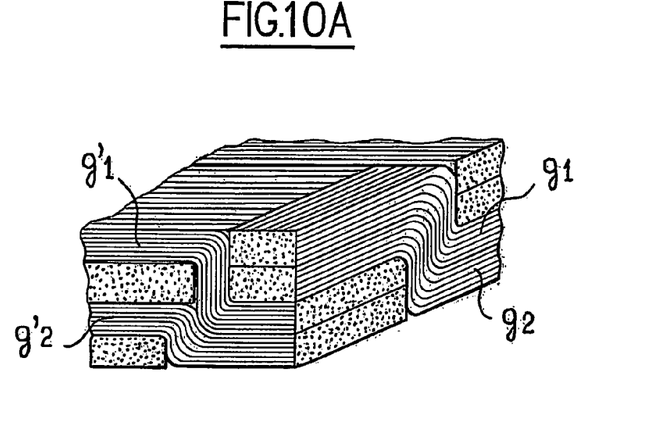

The rovings may also be interlaced, e.g. in the form of a braid, thus forming a single sheet, as shown in FIGS. 10 and 10A.

This advantageous feature makes it possible, during inflation, to avoid axial sliding of the fibers relative to one another in the transition zones in which the inclination of fibers varies, between their slightly inclined central portion 50b and their end portions 50a and 50c.

Such sliding is not desirable since it runs the risk of causing the profile of the sleeve to vary in irregular manner in these transition zones.

Figure 11:
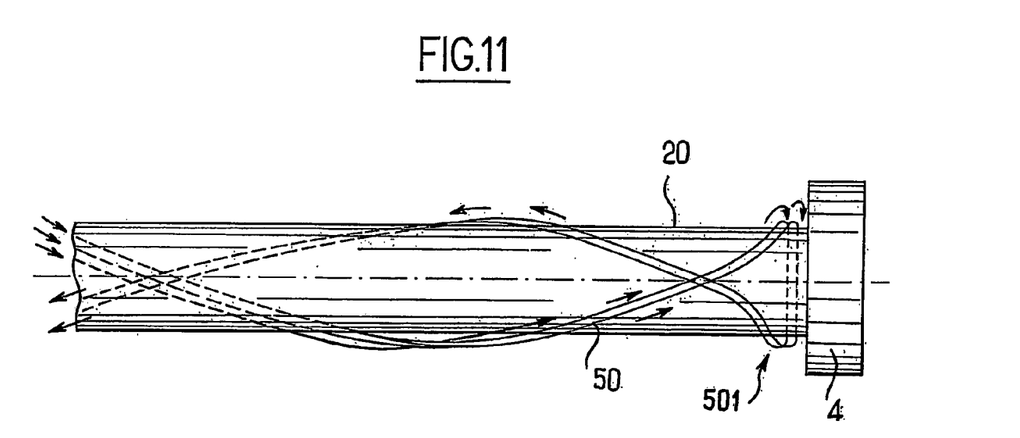
FIG. 11 is a diagram showing how a yarn or a roving can be wound so as to belong to two contiguous sheets.

As shown in FIG. 11, a single roving 50 of very great length can be wound many times in order to form a sheet of crossed rovings.

In one possible embodiment of the invention (not shown in the drawing), an agent that can be compressed very little, that is liquid or pasty, and relatively fluid is injected between the two membranes 20 and 21 so that the fibers constituting the structure 5 are immersed therein.

By way of example, the agent may be an oil, a grease, or silicone resin, and it remains held captive between the two membranes 20 and 21.

Its presence prevents the fibers from being compressed against one another and makes it easier for them to slide relative to one another, thus facilitating expansion of the fiber structure during inflation and shrinkage thereof during deflation.

Figure 12:
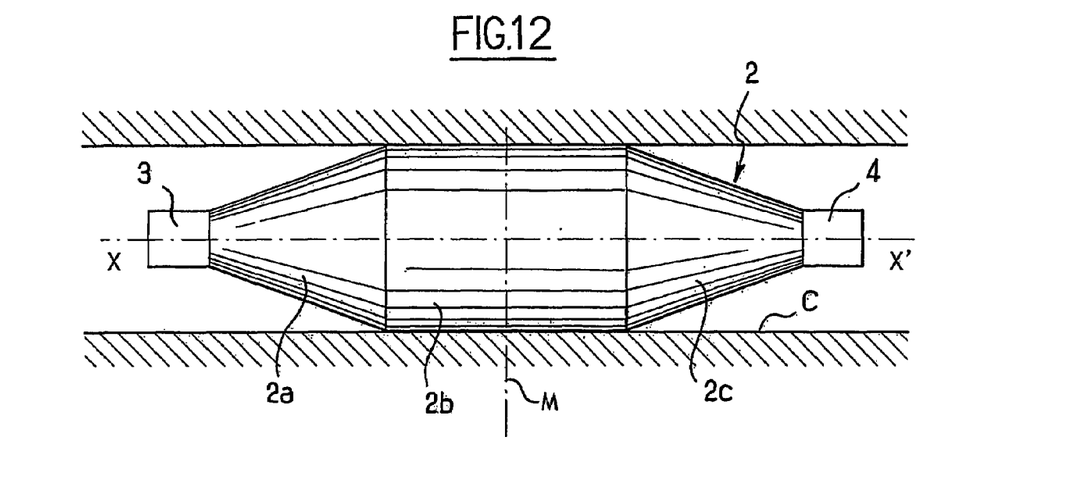
FIGS. 12 and 13 are diagrams showing two different possible configuration for the device, in the inflated state, respectively in which the central portion of the sleeve is disposed in a middle portion, and in which it is offset longitudinally relative to a transverse plane of symmetry.
Figure 13:
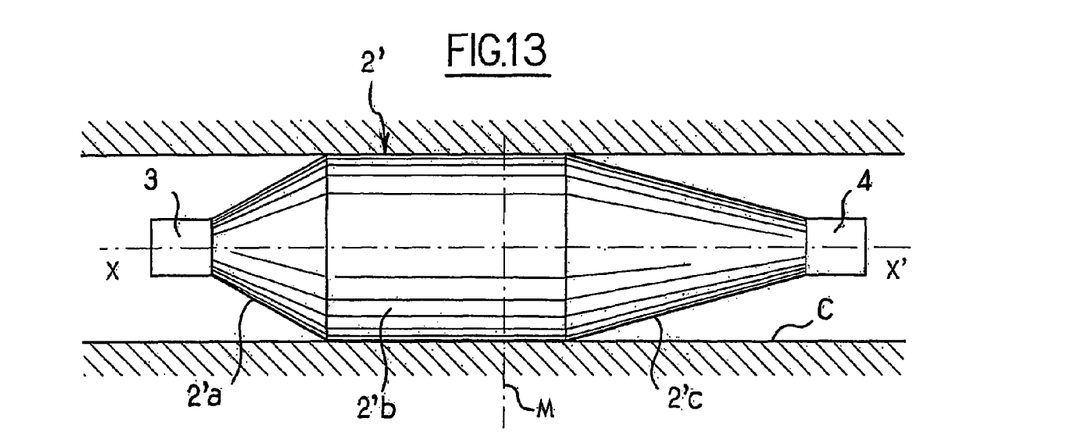

FIGS. 12 and 13 show two different embodiments of a device in accordance with the invention in the inflated state, in which they plug a pipe or a well hermetically, by pressing the central portion $2b$, $2'b$ of the sleeve 2 or 2' respectively against the wall C of the pipe or the well.

In the embodiment shown in FIG. 12, the central portion $2b$ occupies the middle portion of the device, symmetrically on either side of its transverse midplane M. The transition zones $2a$ and $2b$ that connect this central portion to the end members 3 and 4 respectively are of equal length.

However this symmetrical disposition is not essential.

In certain situations, it can be advantageous to adopt a configuration of the kind shown in FIG. 13, without thereby going beyond the ambit of the invention.

In this embodiment, the central portion $2'b$ is offset longitudinally towards one end of the device, specifically towards the member 3, relative to the transverse midplane M.

The transition zones $2a$ and $2b$ that connect the central portion to the end members 3 and 4 respectively are then of different lengths.

Figure 14:
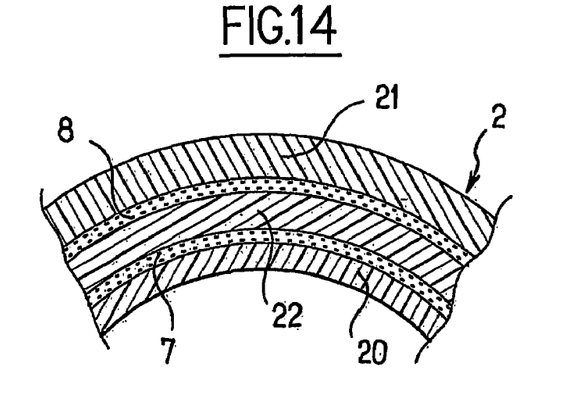
FIG. 14 is a fragmentary cross-section view showing a variant of the device provided with two fiber structures.

FIG. 14 shows a variant in which the sleeve is made up of two fiber structures 7, 8, each possessing the same characteristics as the above-described structure 5.

The sleeve possesses a middle membrane 22 similar to the membranes 20 and 21.

One of the fiber structures 7 is interposed between the inner and middle membranes 20 and 22; the other fiber structure 8 is interposed between the middle and outer membranes 22 and 21.

With reference more particularly to FIGS. 15 to 18, there follows an explanation of how to calculate the laying angle for a fiber, slice by slice.

Figure 15:
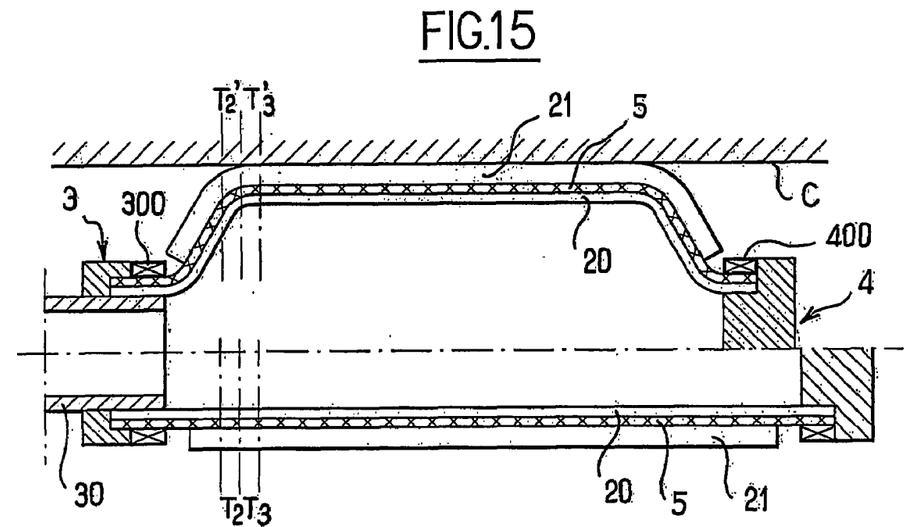
FIG. 15 is a diagrammatic view of a device in accordance with the invention, shown in axial section, the bottom and top half-views corresponding respectively to the non-inflated state and to the inflated state of the packer.

FIG. 15 shows a packer device whose outer skin 21 is shorter than the inner sealing membrane 20 and than the intermediate fiber layer 5, with only the inner membrane 20 and the fiber layer 5 then being bonded at their ends to the metal members 3 and 4, in this case by means of retaining rings 300 and 400, respectively.

A comparison between the bottom and top half-views shows that the packer shortens axially on being inflated.

In order to determine the winding angles, the packer is subdivided virtually into identical slices of a certain length, e.g. 10 mm, two of which are referenced in FIG. 15 as T2, T3 prior to inflation and T'2, T'3 after inflation (with axial shrinking).

Figure 16:
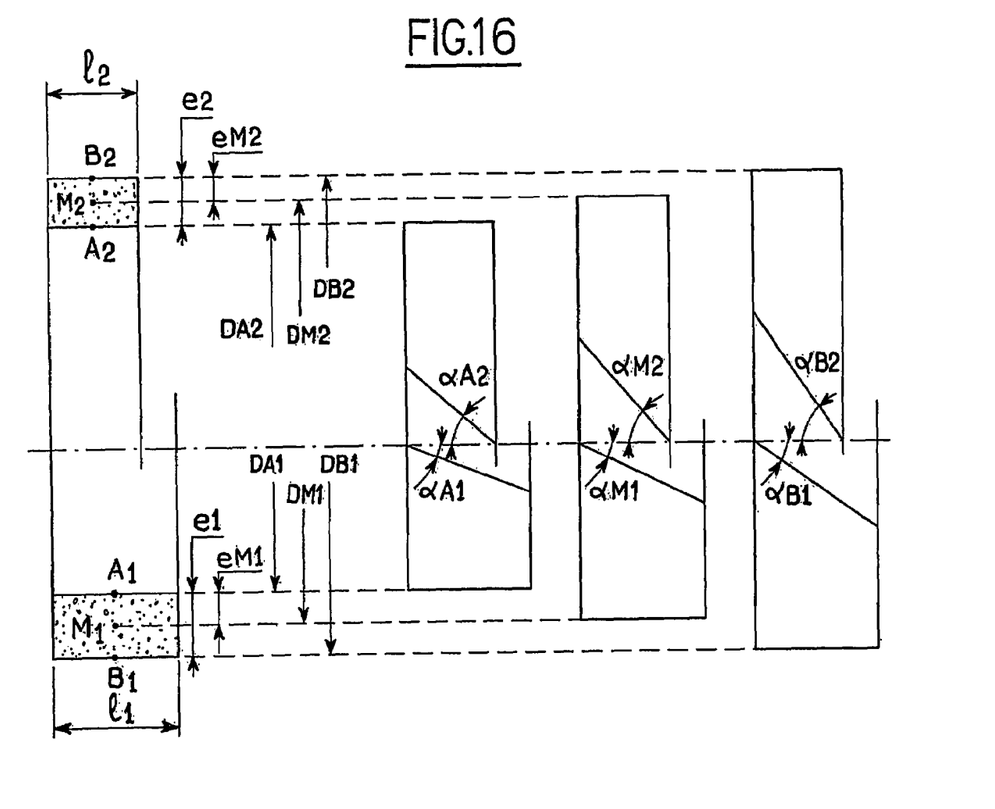
FIG. 16 is a diagram for explaining how the laying angles of a fiber are calculated slice by slice.

FIG. 16 shows a slice before and after inflation, situated at an arbitrary location on the axis of the packer.

Points A, M, and B represent respectively the position in which the fibers are wound respectively on diameters $D_{A1}$, $D_{M1}$, and $D_{B1}$ prior to inflation and $D_{A2}$, $D_{M2}$, and $D_{B2}$ after inflation.

Each fiber will present identical shortening movements if the following relationship is satisfied:

$$\frac{D_{A2}}{D_{A1}} \times \frac{\tan(\alpha_{A1})}{\tan(\alpha_{A2})} = \frac{D_{m2}}{D_{m1}} \times \frac{\tan(\alpha_{m1})}{\tan(\alpha_{m2})} = \frac{D_{B2}}{D_{B1}} \times \frac{\tan(\alpha_{B1})}{\tan(\alpha_{B2})}$$

The laying angles prior to inflation for each fiber, roving, yarn, or cable thus need to be calculated, slice by slice, in such a manner that all of the fibers in a given slice are subjected to identical shortening associated with inflation, this feature making it possible to stress each fiber in quasi-identical manner while pressure is being applied.

To do this, and for a fiber structure that is dense, the fibers positioned at locations A, M, and B in a single slice need to satisfy two equalities:
1) relating to shortening of the slice during inflation; and
2) relating to conserving the volume of the fiber structure before and after inflation.

First Equality

During the inflation stage, the fibers move in a manner that is linked to their angle and their winding diameter. (See FIGS. 17 and 18)

Figure 17:
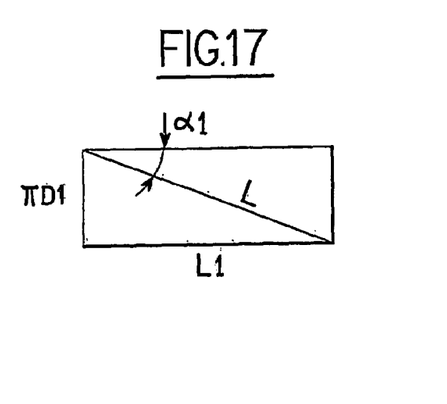
FIGS. 17 and 18 are diagrams of a fiber when unwound corresponding to one pitch, respectively before and after inflation.
Figure 18:
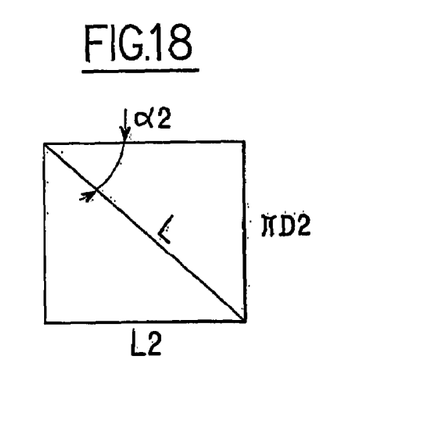

The lengths $L_1$ and $L_2$ are respective pitches of the fiber on its diameters before and after inflation, where pitch is the distance necessary for a fiber wound at a given angle to be wound through one turn.

A fiber that is laid at an angle $\alpha_1$ on a diameter $D_1$ takes on an angle $\alpha_2$ when the diameter increases in order to reach the diameter $D_2$.

For this fiber, the length L of the fiber does not change, so the movement is given by the following equality:

$$\frac{D_1}{D_2} = \frac{\sin(\alpha_1)}{\sin(\alpha_2)}$$

in which $D_1$, $D_2$, and the angle $\alpha_1$ are known, and from which the angle $\alpha_2$ can be deduced.

The shortening ratio of the pitches, $L_2/L_1$ is identical to the shortening ratio of the slice $l_2/l_1$.

This ratio is given by the following equality:

$$\frac{L_2}{L_1} = \frac{l_2}{l_1} = \frac{D_2}{D_1} \times \frac{\tan(\alpha_1)}{\tan(\alpha_2)}$$

in which $L_1$ is the pitch of the fiber before inflation on the diameter $D_1$, and $L_2$ is the pitch of the fiber after inflation on the diameter $D_2$.

Knowing the angles $\alpha_1$ and $\alpha_2$ and also the diameters $D_1$ and $D_2$, the pitch shortening ratio $L_2/L_1$ or the slice shortening ratio $l_2/l_1$ can be deduced therefrom.

Second Equality

If the density of the fibers is large, the fibers behave like a volume that is incompressible and that is deformable under the action of pressure. The volume of the slice is conserved before and after inflation.

In a given slice, volume conservation is represented by the following equality:

$$(D_{A1} \times e_1 + e_1^2) \times l_1 = (D_{A2} \times e_2 + e_2^2) \times l_2$$

The diameters $D_{A1}$ and $D_{A2}$ are known.

The width $l_1$ is given (the width of the virtual slice before inflation).

The width $l_2$ is determined by the shortening ratio of the slice $L_2/L_1$ by using the equality:

$$l_2 = l_1 \times \frac{L_2}{L_1}$$

The thickness $e_1$ is known: it is the thickness of the fiber layer in the slice under consideration.

The value of $e_2$ can thus be deduced therefrom.

After determining the parameters of the slice (calculating $l_2/l_1$ and $e_2$), it is possible for each fiber positioned on an arbitrary diameter $D_m$ prior to inflation to calculate its angle $\alpha_m$ relative to the axis, in such a manner that its axial shortening ratio $l_2/l_1$ is equal to that of the slice.

Deducing the Laying Angle for Each Fiber Prior to Inflation

For any fiber positioned on a diameter $D_m$ prior to inflation, the following values are written:

- $\alpha_{m1}$: the angle of the fiber relative to the axis before inflation (unknown);
- $\alpha_{m2}$: the angle of the fiber relative to the axis after inflation (unknown);
- $D_{m1}$: the winding diameter of the fiber before inflation (known); and
- $D_{m2}$: the winding diameter of the fiber after inflation (unknown).

It is necessary to calculate $\alpha_{m1}$ so that the axial shortening ratio is equal to $l_2/l_1$.

From the known values for $e_2$, $e_1$, $D_m$, $D_{A1}$, and $D_{A2}$, it is possible to calculate $D_{m2}$:

$$D_{m1} = D_{A1} + 2 \times e_{m1}$$
$$D_{m2} = D_{A2} + 2 \times e_{m2},$$

and $$e_{m2} = e_{m1} \times \frac{e_2}{e_1}$$

Simplifying, and assuming that the values of $e_1$ and $l$ are relatively small, e.g. 10 mm for $l_1$ and 8 mm for $e_1$, the value of $D_{m2}$ can be deduced by using the following relationships:

$$D_{m2} = D_{A2} + (D_m - D_{A1}) \times \frac{e_2}{e_1}$$

(an exact calculation could be performed, but the principle of the calculation described remains identical).

The values of $D_{m1}$ and $D_{m2}$ and also the value $l_2/l_1$ calculated with the first equality are known.

It is possible to calculate the ratio of the tangents of the angles $\alpha_{m1}$ and $\alpha_{m2}$ that certify the following condition:

$$\frac{\tan(\alpha_{m1})}{\tan(\alpha_{m2})} = \frac{L_2}{L_1} \times \frac{D_{m1}}{D_{m2}}$$

There is only one angle $\alpha_{m1}$ that satisfies this condition.

This angle $\alpha_{m1}$ is thus the laying angle for the fiber on a diameter $D_m$ of the fiber structure.

In order to give an example, consider a slice T3 (see FIG. 15) having a width of 10 mm, and positioned on the axis of a packer whose fiber structure prior to inflation has the following characteristics:

$D_{A1}$=90 mm
$e_1$=8 mm
$l_1$=10 mm
angle of the fiber relative to the axis at the point A=30°.

After inflation, the inside diameter $D_{A1}$ of the fiber structure goes from 90 mm to a diameter $D_{A2}$ of 130 mm.

The angles before inflation of the fibers positioned respectively at the point M and B of the slice T3 of the fiber structure need to be respectively 31.60° and 33.15° in order to satisfy the equalities that enable tension to be identical when the inside diameter of the fiber structure goes during inflation from 90 mm to 130 mm.

Consider a new slice T2 having a length of 10 mm, positioned closer to the end of the packer (see FIG. 15), such that its fiber structure before inflation has the following characteristics:

$D_1$=90 mm
$e_1$=8 mm
$l_1$=10 mm
angle of the fiber relative to the axis at the point A=40°.

The angles before inflation of the fibers positioned respectively at the points M and B of said slice T2 of the fiber structure need to be respectively 41.2° and 42.3° in order to satisfy the equalities that permit the tension to be identical when the inside diameter of the fiber structure passes during inflation from 90 mm to 110 mm.

It should be observed that the diameter, after inflation, of the fiber structure situated at the slice T3 is greater than the diameter of the fiber structure situated at the slice T2 because of the blocking angle close to 55° taken by the fibers when they are subjected to internal pressure with a background effect.

The calculations are performed in this way slice by slice, and fiber layer by fiber layer, so as to enable each fiber of the structure to be stressed mechanically in quasi-identical manner.

A single support could be provided with a pair of fiber structure sleeves each in accordance with the invention, the sleeves being carried by a single support but being offset axially, so as to isolate from one another three portions of a pipe or well, in particular for testing or treating the wall of the intermediate portion, as is known per se (see for example patent documents U.S. Pat. No. 4,815,538 and FR 2 710 155).

The fine and long fibers having high mechanical strength that make up the fiber structure could be "nanofibers" without going beyond the ambit of the present invention.

What is claimed is:

1. A sealing device for shutting a pipe or a well, the device comprising:
a sleeve that is radially expandable under the action of an inflation fluid in order to be pressed hermetically against the wall of the pipe or the well, the sleeve being fastened to end members, wherein said sleeve comprises:

firstly a pair of cylindrical membranes having walls that are flexible and elastic, the membranes being engaged coaxially one in the other and comprising an inner membrane for being subjected internally to the pressure of the inflation fluid and an outer membrane for being pressed against the wall of the pipe or the well in order to seal it off, and secondly at least one very dense annular fiber structure formed of a multitude of fine and long fibers having high mechanical strength interconnecting said end members and wound helically about the inner membrane along an axis that coincides with the longitudinal axis of symmetry of the sleeve, and wherein said fiber structure firstly presents a certain thickness and secondly is interposed between said membranes, and wherein the winding angle of the fibers relative to the direction of said longitudinal axis of symmetry has a value that is considerably greater in the end portions of the sleeve than in the central portion thereof, the transition between the two portions taking place progressively over transition zones, with the angles taking on an intermediate value, the winding being such that the density of the fibers progressively diminishes from each end going towards the central portion, the angle of inclination of the fibers before expansion being calculated slice by slice in such a manner that in each of the annular slices of the fiber structure the shortening ratio after radial expansion of the sleeve is substantially constant over the entire thickness of said slice.

2. A sealing device according to claim 1, wherein the density of said annular fiber structure is such that after the sleeve has expanded radially, said fibers are touching or practically touching, such that the structure serves substantially to provide mechanical reinforcement to withstand high pressure forces and as an anti-extrusion filter to prevent any extrusion of the inner membrane between said fibers under the effect of pressure.

3. A sealing device according to claim 1, wherein the transition zones are of different lengths.

4. A sealing device according to claim 1, wherein said fibers are made of a material having high traction strength, such as in particular, fibers of aramid, of carbon, of glass, or of steel.

5. A sealing device according to claim 4, wherein said fibers are circular in section with a diameter of less than 0.5 mm.

6. A sealing device according to claim 5, wherein the diameter of the fibers lies in the range 5 μm to 100 μm, approximately, and is preferably about 10 μm to 20 μm.

7. A sealing device according to claim 6, wherein the density of the fibers within said fiber structure, considered in a section plane extending transversely relative to the sleeve, lies in the range 100 fibers/mm$^2$ to 45,000 fibers/mm$^2$, and is preferably about 10,000 fibers/mm$^2$.

8. A sealing device according to claim 1, wherein the fibers constituting the fiber structure are grouped together to constitute a plurality of yarns, rovings, or cables that are independent of one another.

9. A sealing device according to claim 8, wherein said fiber structure is made up of a plurality of contiguous concentric sheets, and the angular orientations of the fibers constituting two contiguous sheets are opposite, and wherein at least some of said rovings are common to a plurality of sheets.

10. A sealing device according to claim 1, wherein said fiber structure is made up of a plurality of contiguous concentric sheets, and the angular orientations of the fibers constituting two contiguous sheets are opposite.

11. A sealing device according to claim 1, wherein, trapped between said inner and outer membranes, the device includes a highly deformable agent in which the fibers constituting said structure are coated.

12. A sealing device according to claim 11, wherein said agent is a rubber, an oil, a grease, or silicone resin.

13. A sealing device according to claim 1, wherein the fibers constituting said fiber structure are coated in a material that is solid but that presents characteristics of high flexibility and elasticity, not impeding the ability of said structure to deform freely relative to the surrounding membranes.

14. A sealing device according to claim 1, wherein the winding angle of the fibers relative to the direction of said longitudinal axis of symmetry has a value of about 45° to 60° in the end portions of the sleeve, and a value of about 15° to 30° in the central portion thereof.

* * * * *